Aug. 28, 1951 F. T. BYERS 2,565,801
LIVESTOCK FEEDING APPARATUS
Filed Oct. 19, 1945 2 Sheets-Sheet 1
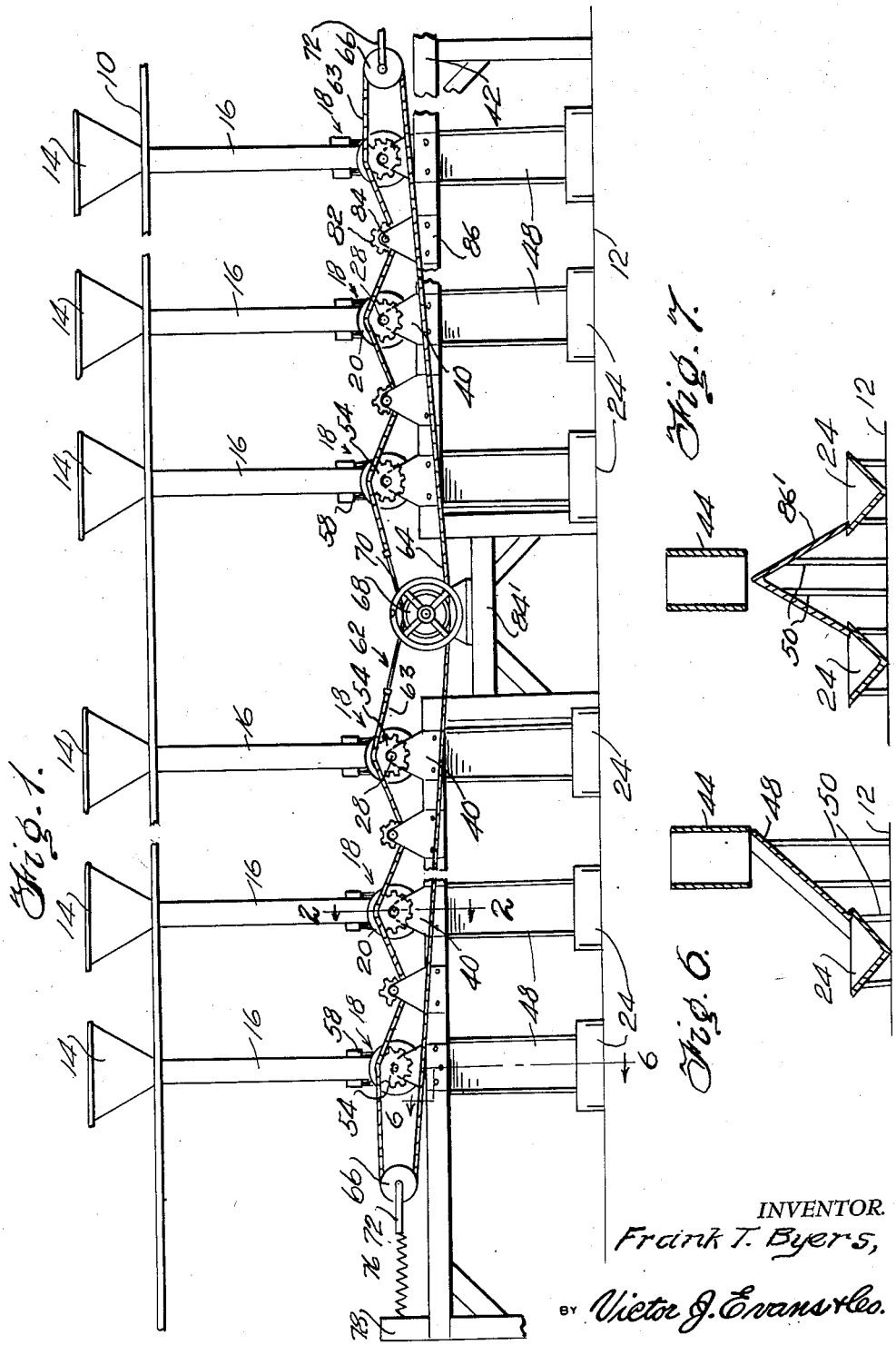
INVENTOR.
Frank T. Byers,
BY Victor J. Evans & Co.
ATTORNEYS

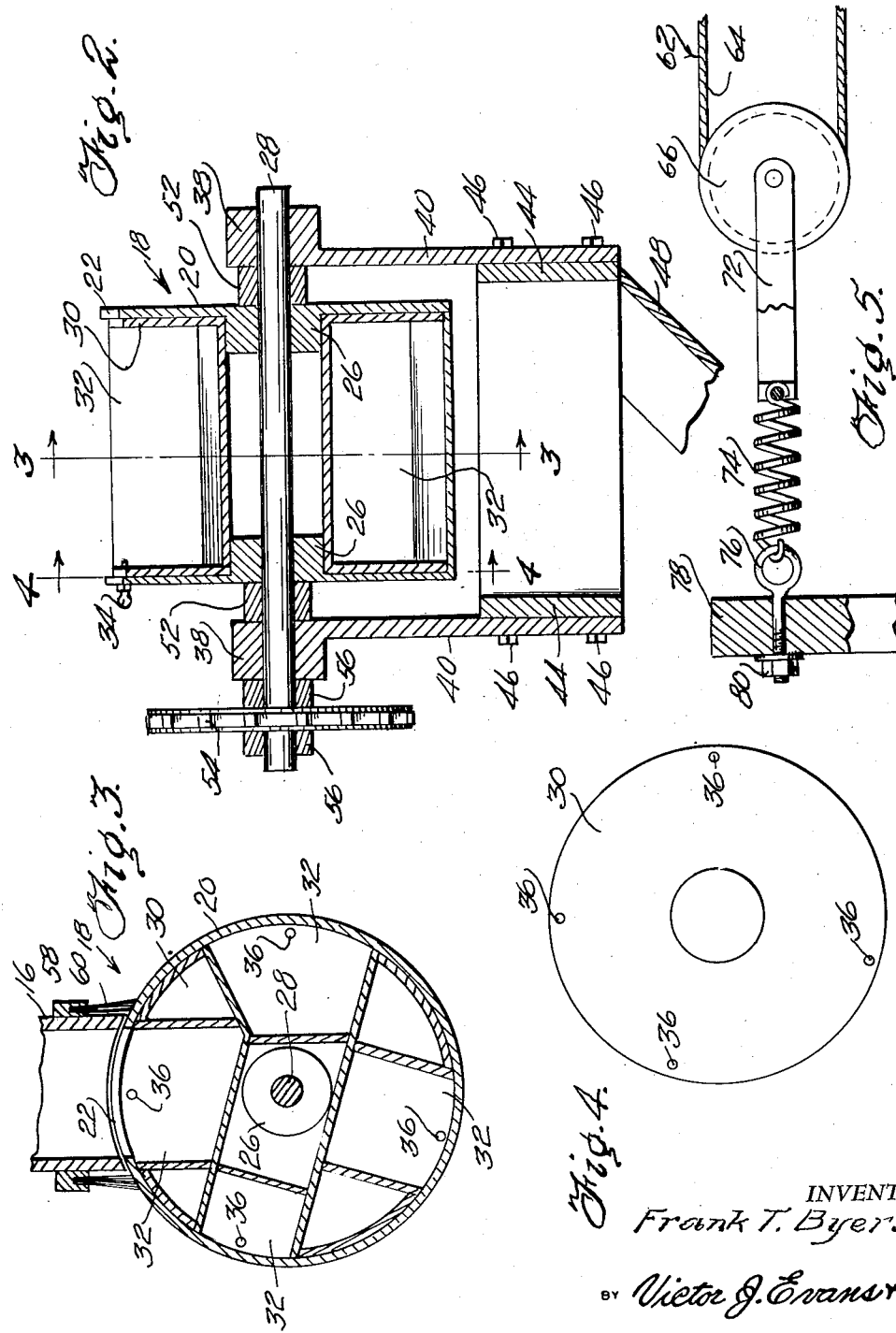

Patented Aug. 28, 1951

2,565,801

UNITED STATES PATENT OFFICE 2,565,801

LIVESTOCK FEEDING APPARATUS

Frank T. Byers, Mount Pleasant, Pa.

Application October 19, 1945, Serial No. 623,201

1 Claim. (Cl. 119—56)

This invention relates to a livestock feeding apparatus, for feeding the livestock in measured quantities.

This invention relates particularly to the measuring and distributing of feed for livestock in predetermined quantities, to feed boxes or troughs from which the animals are to be fed.

An object of the invention is to lessen the labor requirements and expedite the feeding of the livestock at a time when labor is scarce.

Another object of the invention, is to provide means for storing the feed in overhead containers which are connected to unit batchers at floor level.

For the purpose of illustrating one arrangement by which the invention may be carried out and for the purpose of more clearly describing the method of feeding livestock, reference is made to the accompanying drawings in which:

Fig. 1 is an elevational view of an apparatus used in carrying out the method of feeding the livestock.

Fig. 2 is a sectional view on the line 2—2 of Fig. 1.

Fig. 3 is a sectional view on the line 3—3 of Fig. 2.

Fig. 4 is a sectional view on the line 4—4 of Fig. 2.

Fig. 5 is an enlarged view of the sprocket chain tightener.

Fig. 6 is a sectional view on the line 6—6 of Fig. 1 showing feed being fed to one feed trough and Fig. 7 is a sectional view showing the use of two opposed feed troughs.

Referring more particularly to the drawings wherein is shown one embodiment of an apparatus used for feeding livestock the numeral 10, designates the floor of the barn in which the feed is usually stored, and 12 the ground or surface of the stalls, in which the livestock is usually fed.

Funnels 14, providing storage hoppers and positioned in openings in the floor are positioned to be filled with feed and the feed is fed from the funnels by vertical feed chutes or delivery pipes 16, which are connected at their lower ends to unit batchers or measuring units 18. These batchers may be used to feed livestock in single stalls or livestock in oppositely positioned stalls, depending upon the size of the barn in which the livestock is fed.

The batchers 18 comprise a cylindrical drum 20, having an opening 22, in the peripheral wall thereof for the reception of the feed from the chutes 16, and for delivering the feed to the troughs 24. The drums 20 are provided with end walls having opposed circular hubs 26, which are fixed to the shaft 28.

Rotatably mounted on the hubs 26 is the feed measuring and distributing valve 30, the peripheral surface of which is provided with a plurality of compartments 32, that vary in size so that a small amount of feed can be fed at the start and the amount proportionally increased as the livestock requirements increase. The valve can be rotated on the hubs and retained in the desired feeding capacity position by means of a pin 34, slidably mounted in the side of the drum 20 and receivable in apertures 36, positioned at the medial uper edge of the compartments 32.

The axle or shaft 28 is journalled in bearings 38, of the triangular supports 40 and the shaft 28, extends transversely of the longitudinally extending platform 42 and to the side 44 of the latter are secured the supports 40, by means of bolts 46. The delivery chute 48 has its upper end secured to the sides 44 of the platform 42, and depends downwardly therefrom at an inclined relation thereto to discharge into the trough 24, vertical braces 50 properly support the chute 48 and trough 24, spacers or washers 52 mounted on the shaft 28 intermediate the drum 20 and bearings 38 permit free rotation of the drums as desired. A sprocket wheel 54 is fixed to the shaft 28 and is positioned intermediate spacers or washers 56.

It is to be understood that each unit batcher is similarly constructed and the number to be used depends on the amount of livestock to be fed.

In order to save feed and prevent the feed from spilling over the drums of the batchers the lower ends of the delivery pipes 16 at the point where they discharge into the batchers 18 are provided with brush heads 58, having bristle tufts 60 which contact the drums 20 and clean all spilled feed therefrom as the drums rotate.

To feed a plurality of troughs as shown in Figure 1 a combination sprocket chain and cable 62 is employed the sprocket chain portion 63 contacts the sprocket wheels 54 and the cable portion 64 is trained through tension pulleys 66 positioned at diametrically opposed ends of the platform 42 and the drum 68 which controls the movement of the drum and cable 62 by means of the band wheel 70.

The pulleys 66 are journalled in the U-shaped bearing brackets 72 and the brackets 72 are connected to the tensioning spring 74 which in turn is connected to an eye bolt 76 fastened to the upright 78 of the platforms 42 and retained thereon by means of the nut 80. Thus the pulley will keep the cable tight during the operation thereof.

The sprocket portion 63 of the chain and cable 62 is maintained in a taut condition by means of the idler sprocket wheels 82 secured to the shafts 84, journalled in supports 86 secured to the platforms 42 intermediate the batchers 18, and the sprocket portion 63, is trained under the wheels 82.

When the apparatus is installed the batchers are positioned in a straight line and are spaced five feet apart from center to center, and the drum 68 is mounted on a table 84 secured to and intermediate the platforms 42.

The valves 30 are so positioned in the drums 20 and the drums 20 positioned in relation to the delivering pipes 16 that when the wheel 70 is turned clockwise alternate troughs are supplied with feed and when turned anticlockwise the remaining troughs are supplied with feed.

When the modified form of delivering chute 86 is used as shown in Figure 7, it is formed in the shape of an inverted V and will supply the troughs 24 positioned oppositely each other in oppositely positioned stalls.

In feeding livestock it is customary to start with a small amount of feed and batchers are fixed to feed the smallest amount of feed according to the size of the smallest compartment in the feeding and distributing valve. Then as the requirements increase the valve is rotated to the next largest compartment and so on until the livestock is receiving the full amount required.

The drums can be rotated to close the delivery pipe at all times except when it is desired to feed the livestock.

This method of feeding livestock saves time and labor and will automatically feed the amount of grain necessary for the individual stock being fed.

It is to be understood that the apparatus shown is merely one embodiment of apparatus that may be used to carry out the invention and that other types may be used provided the use thereof falls within the spirit of the invention and the scope of the appended claim.

Having thus described the invention what is claimed as new and desired to be secured by Letters Patent is;

In a multiple stock feeder, the combination which comprises a plurality of storage hoppers, feed troughs positioned below the said storage hoppers and connected thereto by chutes, and measuring units in the said chutes, each of said measuring units comprising a cylindrical drum having a peripheral wall with an opening therein and end walls having centrally disposed hubs thereon and extended inwardly therefrom, a cylindrical feed measuring and distributing valve having a plurality of spaced compartments in the peripheral surface, between end walls thereof and positioned in the said drum, said valve journaled on the inwardly extended hubs of the said drum and positioned whereby the compartments thereof register selectively with the opening in the said peripheral wall of the drum, one of the end walls of the said valve having openings therethrough and said openings positioned in the said compartments, a pin mounted in an opening in an end wall of the drum and selectively engaging the openings of the end wall of the said valve, a shaft extended through the drum and valve and having a wheel on one end for rotating the said valve and drum, means journaling the said shaft in a chute in which the said measuring unit is positioned, and brushes carried by the said chute and positioned to engage the peripheral surface of the drum.

FRANK T. BYERS.

REFERENCES CITED

The following references are of record in the file of this patent:

UNITED STATES PATENTS

| Number | Name | Date |
|---|---|---|
| 901,620 | Jenkins | Oct. 20, 1908 |
| 1,433,904 | Mudge | Oct. 31, 1922 |